United States Patent [19]

Nakayama

[11] Patent Number: 5,479,165
[45] Date of Patent: Dec. 26, 1995

[54] TWO-DIMENSIONAL CODING APPARATUS

[75] Inventor: Atsushi Nakayama, Kanagawa, Japan

[73] Assignee: NEC Corporation, Tokyo, Japan

[21] Appl. No.: 305,743

[22] Filed: Sep. 14, 1994

Related U.S. Application Data

[63] Continuation of Ser. No. 967,177, Oct. 27, 1992, abandoned.

[30] Foreign Application Priority Data

Oct. 30, 1991 [JP] Japan .................................. 3-284332

[51] Int. Cl.[6] ................................................ H03M 7/00
[52] U.S. Cl. ........................................ 341/50; 358/432
[58] Field of Search .......................... 341/50; 358/261.3, 358/261.4, 432, 433, 444, 445

[56] References Cited

U.S. PATENT DOCUMENTS 4,800,440  1/1989  Kurokawa .............................. 358/432
4,837,848  6/1989  Henderson et al. .................... 358/432
4,839,738  6/1989  Kaku et al. ......................... 358/261.2

*Primary Examiner*—Howard L. Williams
*Attorney, Agent, or Firm*—Whitham, Curtis, Whitham & McGinn

[57] ABSTRACT

A two-dimensional coding apparatus for two-dimensionally coding binary image data prepared by way of a FIFO memory, which reduces a time for which a host computer participates to enhance the speed of decoding processing. A two-dimensional coding circuit outputs a signal representing whether data to be read out from a memory are reference line data or coding line data, and in response to the signal and a signal read out from the memory, a circuit consisting of an invertor and a pair of AND gates outputs a read-out signal for a reference line FIFO memory and another read-out signal for a coding line FIFO memory. Consequently, the host computer need not control the memory address outputted from the two-dimensional coding circuit to fetch binary image data from the image data FIFO memory, and the FIFO memories can be used without special hardware means for the memory address control.

12 Claims, 6 Drawing Sheets

TWO-DIMENSIONAL CODING APPARATUS

This is a Continuation of application Ser. No. 07/967,177 filed Oct. 27, 1992 now abandoned.

BACKGROUND OF THE INVENTION

1. Field of the Invention

This invention relates to a two-dimensional coding apparatus for two-dimensionally coding binary image data, and more particularly to a coding apparatus wherein binary image data are read in from a FIFO (first in first out) memory.

2. Description of the Related Art

Various two-dimensional coding apparatus are already known, and an exemplary one of conventional two-dimensional coding apparatus is shown in FIG. 4. Referring to FIG. 4, the two-dimensional coding apparatus shown includes an image data memory 11 into which binary image data 101 for a plurality of lines are written from the outside. The image data memory 11 further receives, from a two-dimensional coding circuit 5, an address for sequential reference line data or an address for coding line data obtained by a two-dimensional coding procedure as a memory address 207 and simultaneously receives a memory read-out signal 201 from the two-dimensional coding circuit 5. Consequently, binary image data 106 are read out from the image data memory 11 and supplied to the two-dimensional coding circuit 5, in which they are two-dimensionally coded. A resulting code 105 is outputted from the two-dimensional coding circuit 5.

In the conventional two-dimensional coding apparatus, each time coding of binary image data for a number of lines which can be stored at a time in the image data memory 11 is completed, new binary image data must be written into the image data memory 11. Consequently, the time necessary for the write processing increases the coding time of the two-dimensional coding apparatus remarkably when a large number of data are to be coded.

Another exemplary one of conventional two-dimensional coding apparatus is shown in FIG. 5 which employs, in place of the image data memory, a FIFO memory by which binary image data inputted from the outside can be processed sequentially. Referring to FIG. 5, the two-dimensional coding apparatus shown includes two FIFO memories including a reference line FIFO memory 1 and a coding line FIFO memory 2. First, binary image data 101 for one line are written at a time into the reference line FIFO memory 1 and the coding line FIFO memory 2 from the outside.

Meanwhile, an upper address for reference line data is written into an address latch 7 from an external host computer by way of a host bus 209 before coding is started. After coding is started by a coding circuit 5, the coding circuit 5 outputs a memory read-out signal 201 and simultaneously outputs an address for coded line data obtained in accordance with a two-dimensional coding procedure or for coded line data conforming to an interrupt request for reference line data or an address of reference line data as a memory address 207.

In the processing, the value 206 set to the address latch 7 is compared with an upper address of the memory address 207 outputted from the coding circuit 5 by a comparator 6, and when coincidence is determined, the comparator 6 puts into an active state a signal 208 representing that data to be currently read into the coding circuit 5 are reference line data.

When both of the memory read-out signal 201 and the signal 208 from the comparator 6 are active, a readout signal 205 for the reference line FIFO memory 1, which is outputted from a first AND gate 9, is put into an active state, but when both of the memory read-out signal 201 and an output signal 209 of an invertor 8, which inverts the signal 208, are active, another readout signal 204 for the coding line FIFO memory 2, which is outputted from a second AND gate 10, is put into an active state.

When the signal 204 is active, binary image data 102 read out from the coding line FIFO memory 2 are read into the two-dimensional coding circuit 5 by way of a multiplexer 3, but when the signal 205 is active, binary image data 103 read out from the reference line FIFO memory 1 are read into the two-dimensional coding circuit 5 by way of the multiplexer 3, and two-dimensional coding is effected by the two-dimensional coding circuit 5. Thus, a resulting code 105 is outputted from the two-dimensional coding circuit 5.

With the two-dimensional coding apparatus shown in FIG. 5, however, each time two-dimensional coding of data for one line is performed, an address for reference line data must be set to the address latch 7 as seen from FIG. 6, and coding processing cannot be performed during the setting operation. Accordingly, much time is required to effect coding for a plurality of lines.

SUMMARY OF THE INVENTION

It is an object of the present invention to provide a two-dimensional coding apparatus which reduces a time for which a host computer participates to assure high speed decoding processing.

In order to attain the object, according to the present invention, there is provided a two-dimensional coding apparatus, which comprises a pair of FIFO memories for receiving and storing input binary image data therein, discriminating means for receiving stored data from the FIFO memories, discriminating whether the received data are coding line data or reference line data and outputting a discrimination signal, and a two-dimensional coding circuit for receiving stored data from the FIFO memories and two-dimensionally coding the received data in accordance with the discrimination signal from the discriminating means.

With the two-dimensional coding apparatus, input binary image data can be fetched, without an additional circuit, from the FIFO memories and two-dimensionally coded by the two-dimensional coding circuit. Further, a host computer need not manage the address outputted from the two-dimensional coding circuit, and consequently, the burden to the host computer is moderated. Accordingly, there is an advantage that the time required for coding for a plurality of lines is reduced.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
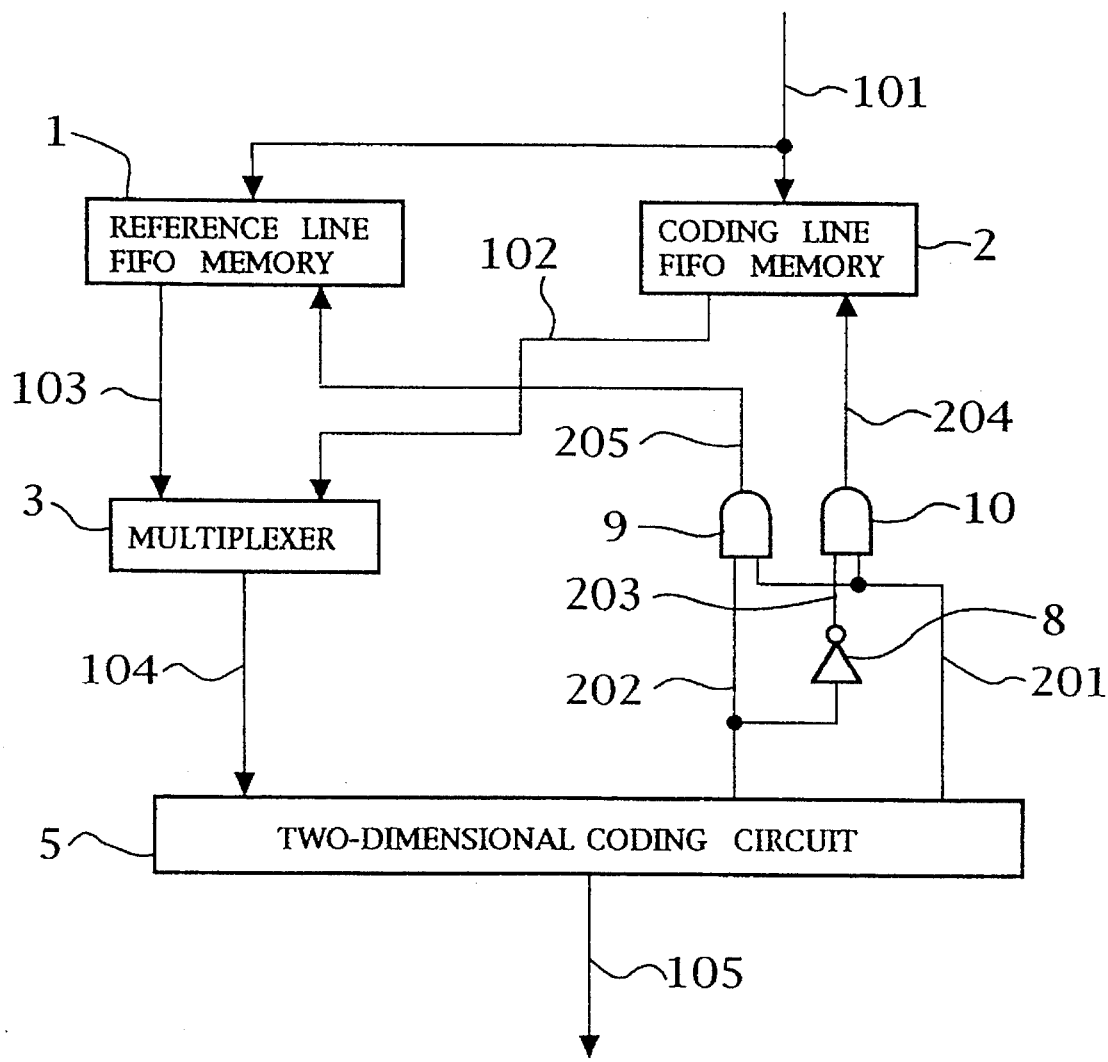
FIG. 1 is a block diagram of a two-dimensional coding apparatus showing a preferred embodiment of the present invention.

Referring first to FIG. 1, there is shown in block diagram a two-dimensional coding apparatus to which the present invention is applied. The two-dimensional coding apparatus shown includes two FIFO memories including a reference line FIFO memory 1 and a coding line FIFO memory 2. First, binary image data 101 for one line are written at a time into the reference line FIFO memory 1 and the coding line FIFO memory 2 from the outside. Binary image data 101 for succeeding lines are read in successively at suitable timings into both of the reference line FIFO memory 1 and the coding line FIFO memory 2. Then, coding is started by a coding circuit 5. When the coding circuit 5 is to read in reference line data, it puts a memory read-out signal 201 and a reference line data requesting signal 202 into an active state in accordance with two-dimensional coding. On the other hand, when the two-dimensional coding circuit 5 is to read in coding line data, it puts only the signal 201 into an active state.

When both of the signals 201 and 202 are active, a read-out signal 205 for the reference line FIFO memory 1, which is outputted from a first AND gate 9, is put into an active state, but when both of the signal 201 and an output signal 203 of an invertor 8, which inverts the signal 202, are active, another read-out signal 204 for the coding line FIFO memory 2, which is outputted from a second AND gate 10, is put into an active state.

The two-dimensional coding circuit 5 renders the signal 201 alternately active and inactive so as to alternately render the signals 205 and the signal 204 active. When the signal 205 is active, binary image data 103 read out from the reference line FIFO memory 1 are supplied to the two-dimensional coding circuit 5 by way of the multiplexer 3, but when the signal 204 is active, binary image data 102 read out from the coding line FIFO memory 2 are supplied to the two-dimensional coding circuit 5 by way of the multiplexer 3, and two-dimensional coding is effected by the two-dimensional coding circuit 5 with the binary image data 103 and 102 supplied thereto from the reference line FIFO memory 1 and the coding line FIFO memory 2, respectively. Here, the binary image data 103 is the same as binary image data of the preceding line, that is, binary image data read out last from the coding line FIFO memory 2. Thus, a resulting code 105 is outputted from the two-dimensional coding circuit 5.

Figure 2:
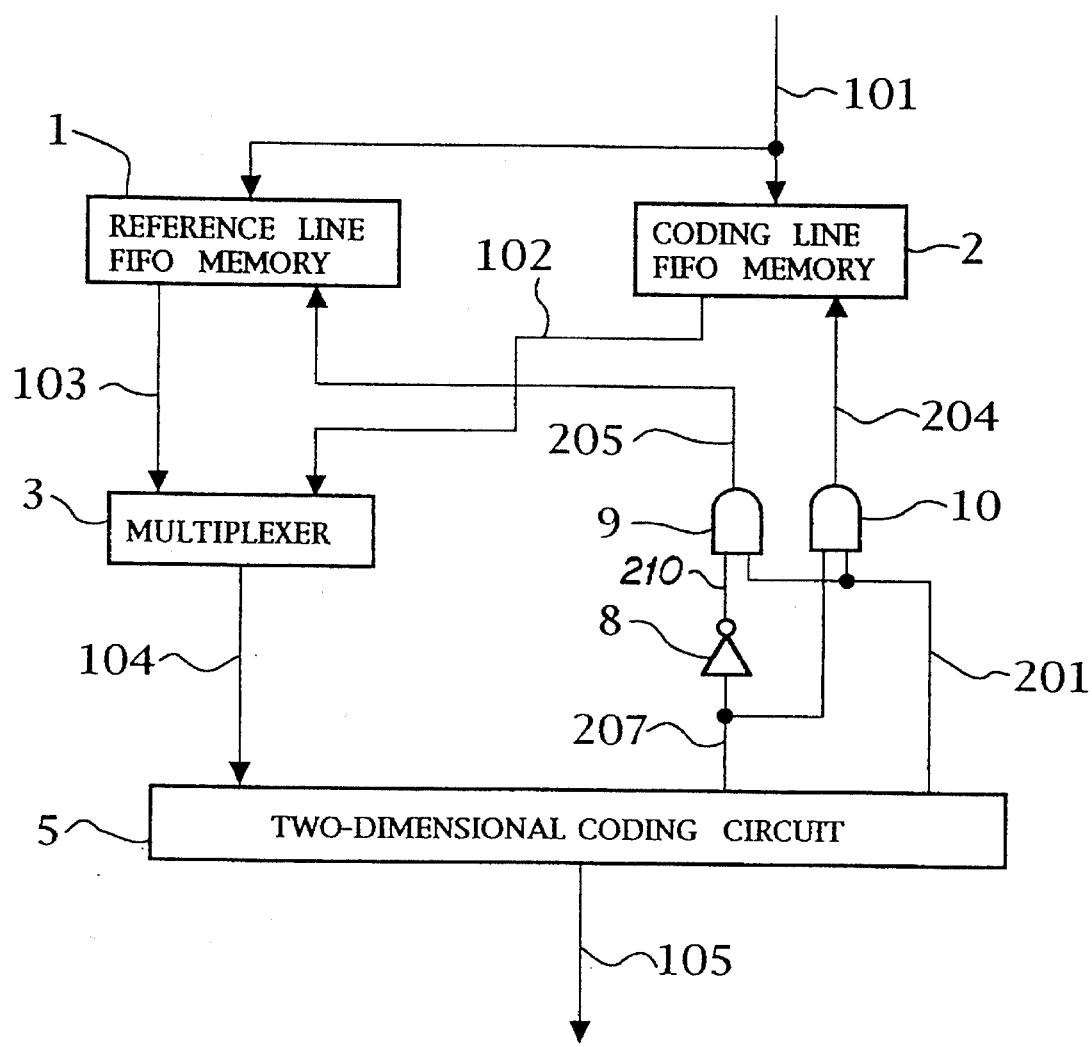
FIG. 2 is a similar view but showing a second preferred embodiment of the present invention.
Figure 3:
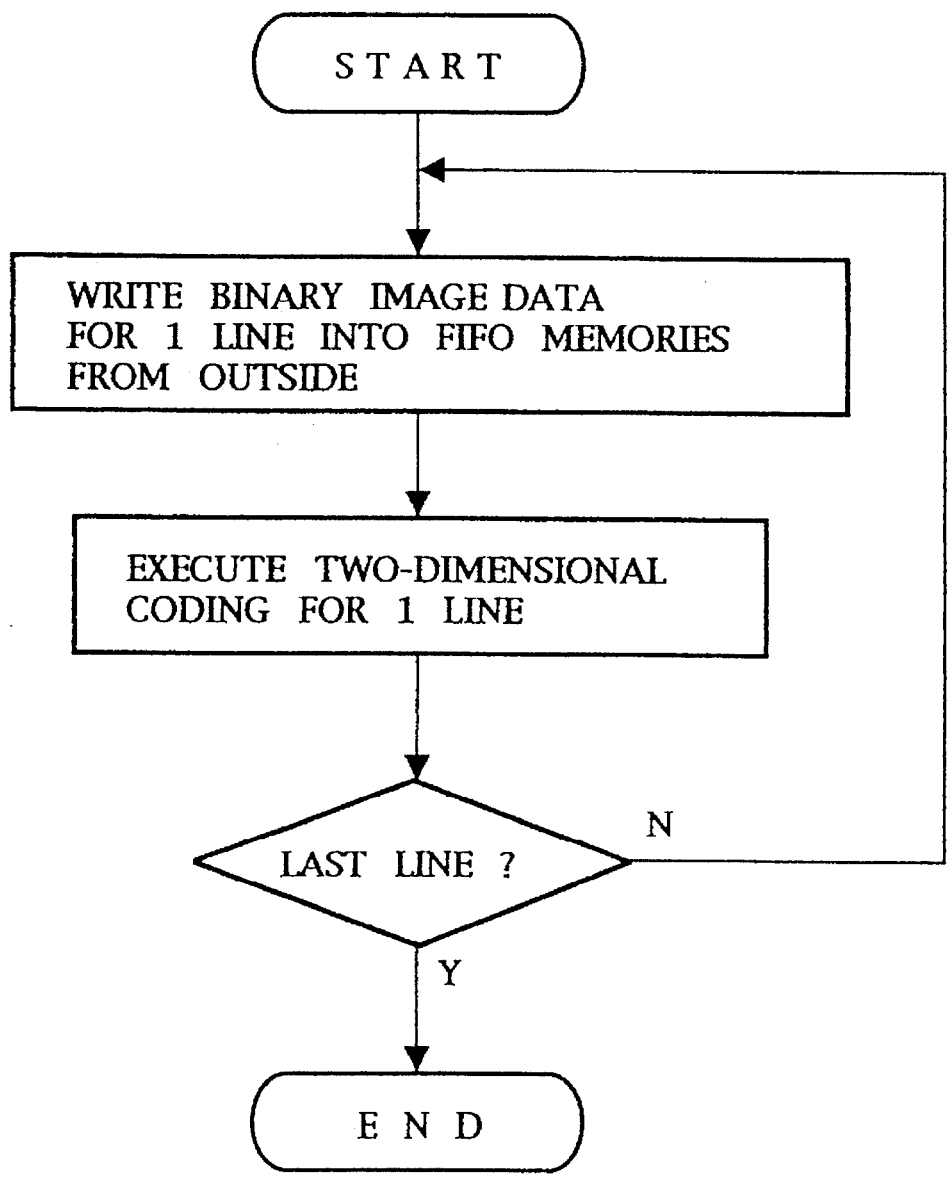
FIG. 3 is a flow chart illustrating a procedure of coding processing of the two-dimensional coding apparatus according to the present invention.
Figure 4:
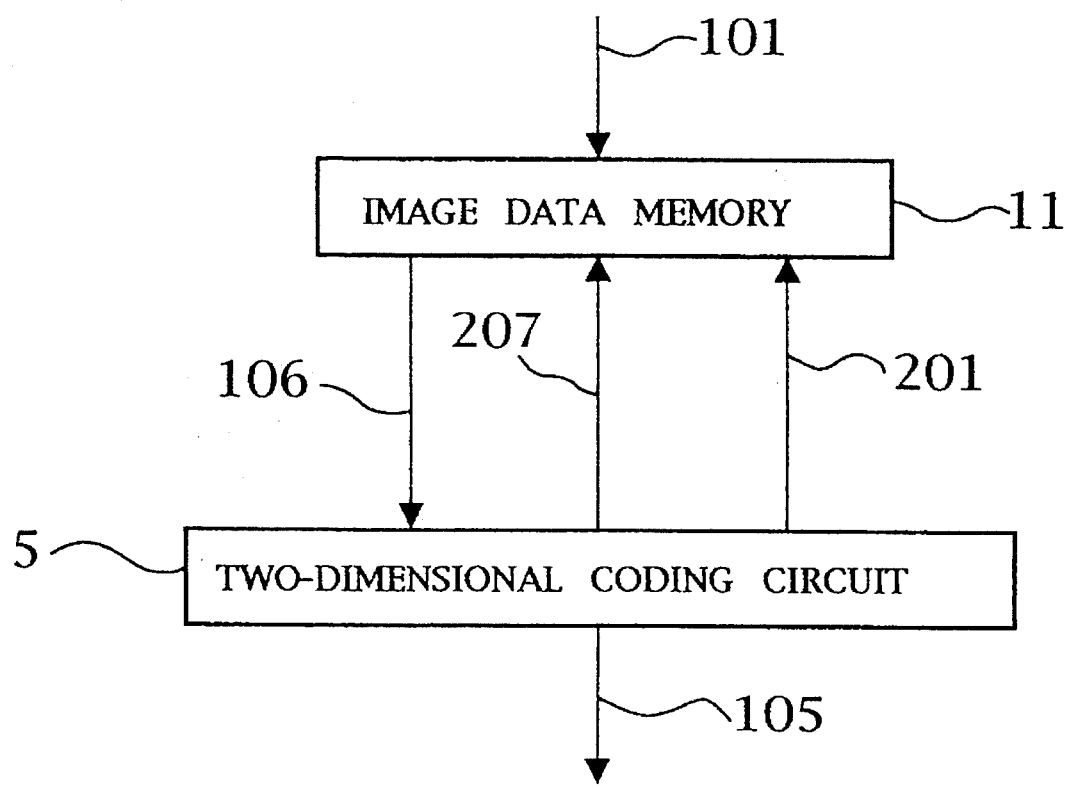
FIG. 4 is a block diagram showing an exemplary conventional two-dimensional coding apparatus which employs an image data memory.
Figure 5:
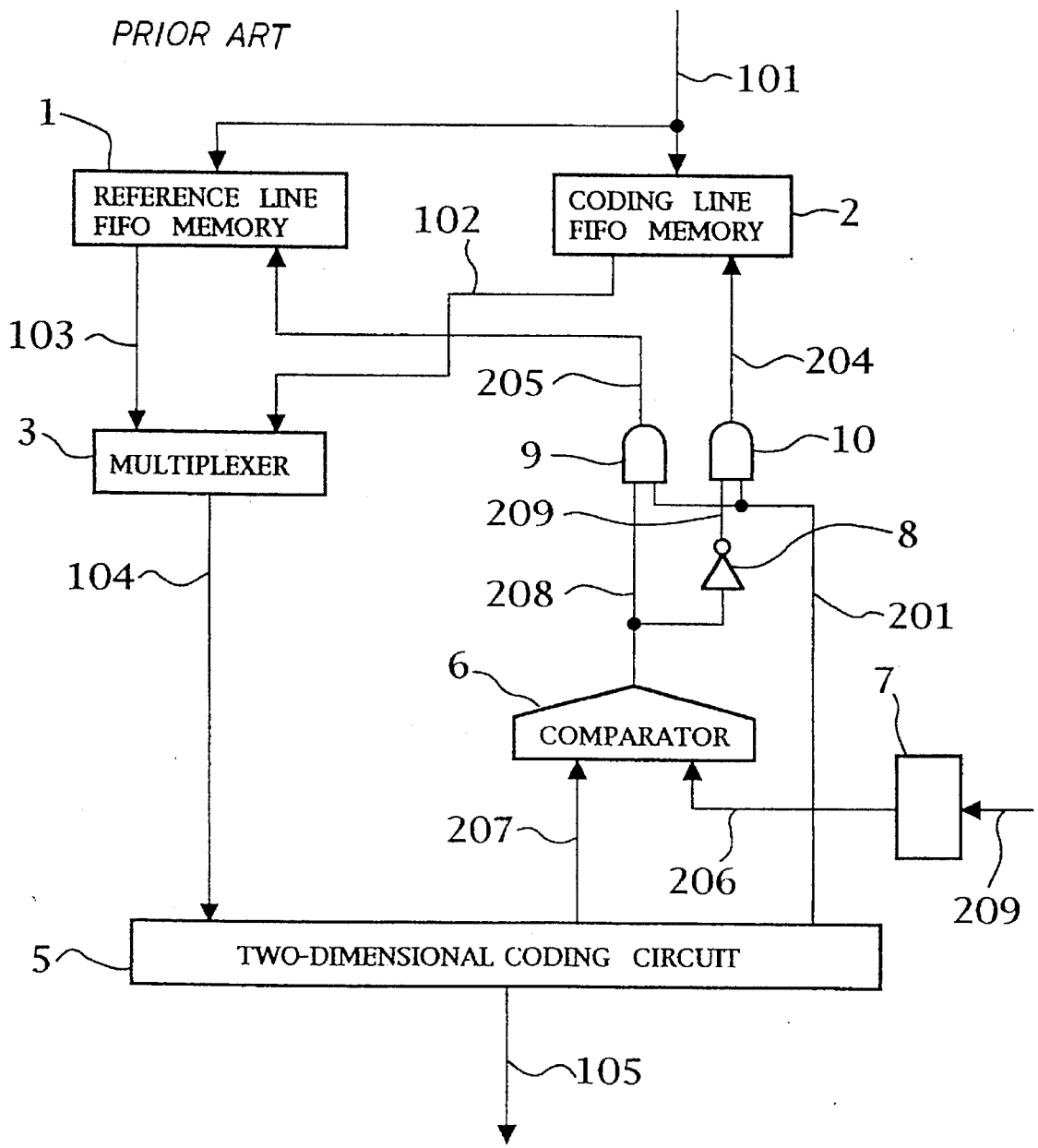
FIG. 5 is a similar view but showing another exemplary conventional two-dimensional coding apparatus which employs a FIFO memory.
Figure 6:
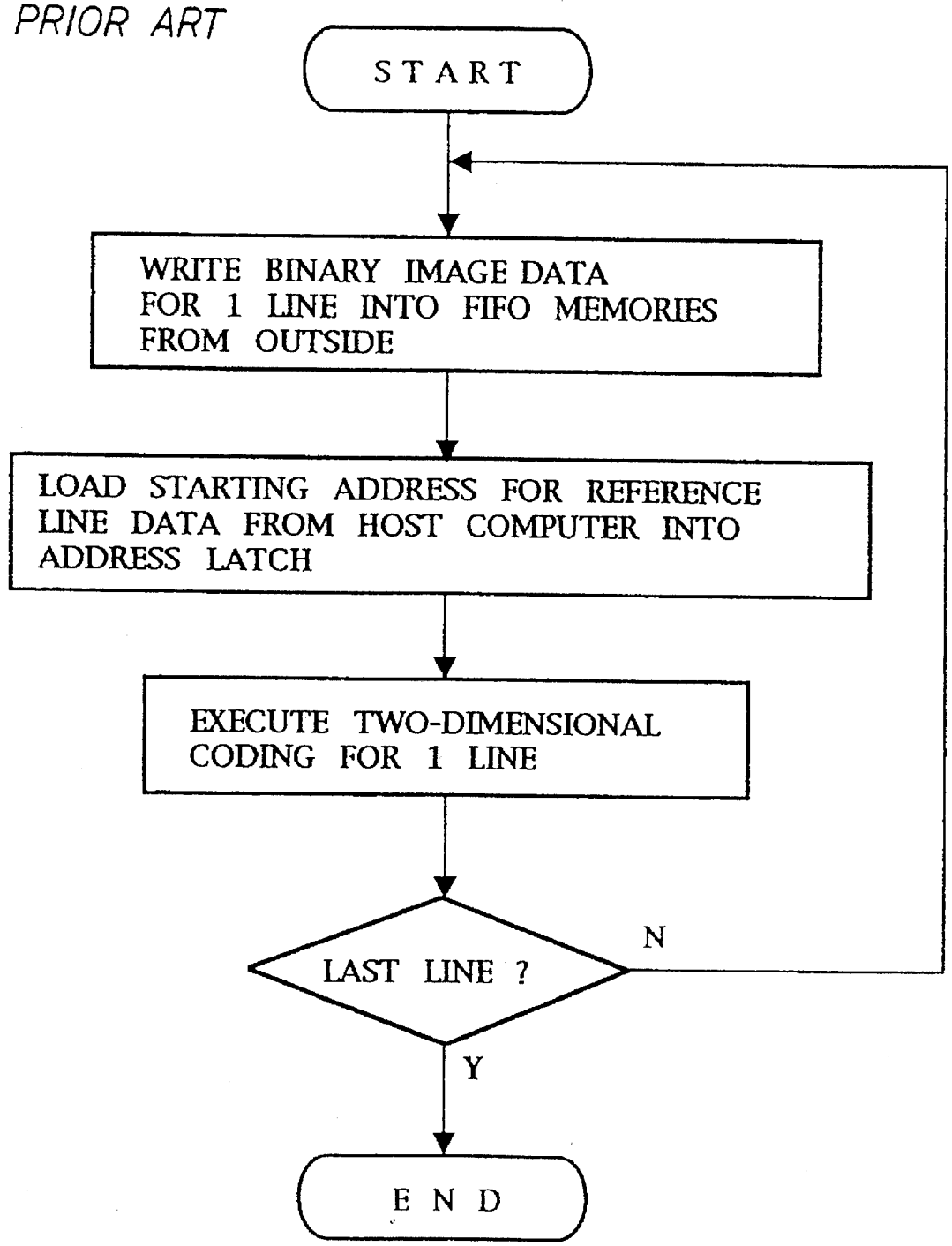
FIG. 6 is a flow chart illustrating a procedure of coding processing of the conventional coding apparatus shown in FIG. 5.

Referring now to FIG. 2, there is shown in block diagram another two-dimensional coding apparatus to which the present invention is applied. The two-dimensional coding apparatus shown is a modification to and is only different from the two-dimensional coding apparatus shown in FIG. 1 in that the invertor 8 is interposed not between the two-dimensional coding circuit 5 and the second AND gate 10 but between the two dimensional coding circuit 5 and the first AND gate 9.

Thus, after coding is started, when the coding circuit 5 is to read in coding line data, it puts a memory read-out signal 201 and a coding line data requesting signal 207 into an active state in accordance with two-dimensional coding. On the other hand, when the coding circuit 5 is to read in reference line data, it puts only the signal 201 into an active state. When both of the signals 201 and 207 are active, a read-out signal 204 for the coding line FIFO memory 2, which is outputted from the second AND gate 10, is put into an active state, but when both of the signal 201 and an output signal 210 of the invertor 8, which inverts the signal 207, are active, another read-out signal 205 for the reference line FIFO memory 1, which is outputted from the first AND gate 9, is put into an active state.

When the signal 204 is active, binary image data 102 read out from the coding line FIFO memory 2 are supplied to the two-dimensional coding circuit 5 by way of the multiplexer 3, but when the signal 205 is active, binary image data 103 read out from the reference line FIFO memory 1 are supplied to the two-dimensional coding circuit 5 by way of the multiplexer 3, and two-dimensional coding is effected by the two-dimensional coding circuit 5. Thus, a resulting code 105 is outputted from the two-dimensional coding circuit 5.

Having now fully described the invention, it will be apparent to one of ordinary skill in the art that many changes and modifications can be made thereto without departing from the spirit and scope of the invention as set forth herein.

What is claimed is:

1. A two-dimensional coding apparatus, comprising:

a reference line first in first out (FIFO) memory (1) and a coding line FIFO memory (2) for receiving and storing binary image data for a reference line and a coding line inputted thereto from the outside, respectively;

a multiplexer (3) for outputting the binary image data read out from the two FIFO memories (1 and 2) from a common output terminal thereof;

a two-dimensional coding circuit (5) for receiving the binary image data outputted from said multiplexer (3) and two-dimensionally coding the received data and for selectively outputting a memory read-out signal and a data requesting signal each having one of an active state and an inactive state; and selective reading means for receiving said memory read-out signal and said data requesting signal outputted from said two-dimensional coding circuit (5) and reading out the binary image data from one of said reference line FIFO memory (1) and said coding line FIFO memory (2) when only the memory read-out signal is active but reading out the binary image data from the other of said reference line FIFO memory (1) and said coding line FIFO memory (2) when both of the memory read-out signal and the data requesting signal are active.

2. The two-dimensional coding apparatus recited in claim 1 wherein said selective reading means comprises:

first and second AND gates each connected to receive said memory read-out signal directly from said two-dimensional coding circuit, one of said first or second AND gates being connected to receive said data requesting signal directly from said two-dimensional coding circuit, said first AND gate for generating a read-out signal to said reference line FIFO memory and said second AND gate for generating a read-out signal to said coding line FIFO memory; and an inverter connected to receive said data requesting signal directly from said two-dimensional coding circuit and connected to provide an inverted data requesting signal to the other of said first or second AND gates.

3. The two-dimensional coding apparatus according to claim 1, wherein said selective reading means comprises first and second AND gates each connected to receive said memory read-out signal directly from said two-dimensional coding circuit, said second AND gate being connected to receive said data requesting signal directly from said two-dimensional coding circuit, said first AND gate for generating a read-out signal to said reference line FIFO memory and said second AND gate for generating a read-out signal to said coding line FIFO memory, wherein said binary image data is written into said reference line and into said coding line simultaneously one line at a time.

4. The two-dimensional coding apparatus according to claim 3, wherein said selective reading means comprises an inverter connected to receive said data requesting signal directly from said two-dimensional coding circuit and connected to provide an inverted data requesting signal to said first AND gate.

5. A two-dimensional coding apparatus, comprising:

a reference line first in first out (FIFO) memory (1) and a coding line FIFO memory (2) for receiving and storing binary image data for a reference line and a coding line inputted thereto from the outside, respectively;

a multiplexer (3) for outputting the binary image data read out from the two FIFO memories (1 and 2) from a common output terminal thereof;

a two-dimensional coding circuit (5) for receiving the binary image data outputted from said multiplexer (3) and two-dimensionally coding the received data and for selectively outputting a memory read-out signal and a reference line data requesting signal each having one of an active state and an inactive state; and selective reading means for receiving said memory read-out signal and said reference line data requesting signal outputted from said two-dimensional coding circuit (5) and reading out the binary image data from said reference line FIFO memory (1) when both of the memory read-out signal and the reference line data requesting signal are active but reading out the binary image data from said coding line FIFO memory (2) when only the memory read-out signal is active.

6. The two-dimensional coding apparatus recited in claim 5 wherein said selective reading means comprises:

first and second AND gates each connected to receive said memory read-out signal directly from said two-dimensional coding circuit, said first AND gate being connected to receive said data requesting signal directly from said two-dimensional coding circuit, said first AND gate generating a read-out signal to said reference line FIFO memory and said second AND gate generating a read-out signal to said coding line FIFO memory; and an inverter connected to receive said data requesting signal directly from said two-dimensional coding circuit and connected to provide an inverted data requesting signal to said second AND gate.

7. The two-dimensional coding apparatus according to claim 5, wherein said selective reading means comprises first and second AND gates each connected to receive said memory read-out signal directly from said two-dimensional coding circuit, said first AND gate being connected to receive said data requesting signal directly from said two-dimensional coding circuit, said first AND gate for generating a read-out signal to said reference line FIFO memory and said second AND gate for generating a read-out signal to said coding line FIFO memory, wherein said binary image data is written into said reference line and into said coding line simultaneously one line at a time.

8. The two-dimensional coding apparatus according to claim 7, wherein said selective reading means comprises an inverter connected to receive said data requesting signal directly from said two-dimensional coding circuit and connected to provide an inverted data requesting signal to said second AND gate.

9. A two-dimensional coding apparatus, comprising:

a reference line first in first out (FIFO) memory (1) and a coding line FIFO memory (2) for receiving and storing binary image data for a reference line and a coding line inputted thereto from the outside, respectively;

a multiplexer (3) for outputting the binary image data read out from the two FIFO memories (1 and 2) from a common output terminal thereof;

a two-dimensional coding circuit (5) for receiving the binary image data outputted from said multiplexer (3) and two-dimensionally coding the received data and for selectively outputting a memory read-out signal and a reference line data requesting signal each having one of an active state and an inactive state; and selective reading means for receiving said memory read-out signal and said reference line data requesting signal outputted from said two-dimensional coding circuit (5) and reading out the binary image data from said coding line FIFO memory (2) when both of the memory read-out signal and the reference line data requesting signal are active but reading out the binary image data from said reference line FIFO memory (1) when only the memory read-out signal is active.

10. The two-dimensional coding apparatus recited in claim 9 wherein said selective reading means comprises:

first and second AND gates each connected to receive said memory read-out signal directly from said two-dimensional coding circuit, said second AND gate being connected to receive said data requesting signal directly from said two-dimensional coding circuit, said first AND gate for generating a read-out signal to said reference line FIFO memory and said second AND gate for generating a read-out signal to said coding line FIFO memory; and an inverter connected to receive said data requesting signal directly from said two-dimensional coding circuit and connected to provide an inverted data requesting signal to said first AND gate.

11. The two-dimensional coding apparatus according to claim 9, wherein said selective reading means comprises first and second AND gates each connected to receive said memory read-out signal directly from said two-dimensional coding circuit, said second AND gate being connected to receive said data requesting signal directly from said two-dimensional coding circuit, said first AND gate for generating a read-out signal to said reference line FIFO memory and said second AND gate for generating a read-out signal to said coding line FIFO memory, wherein said binary image data is written into said reference line and into said coding line simultaneously one line at a time.

12. The two-dimensional coding apparatus according to claim 11, wherein said selective reading means comprises an inverter connected to receive said data requesting signal directly from said two-dimensional coding circuit and connected to provide an inverted data requesting signal to said first AND gate.

* * * * *